(12) United States Patent
Khizar et al.

(10) Patent No.: US 11,234,298 B2
(45) Date of Patent: Jan. 25, 2022

(54) HYBRID NANOREINFORCED LINER FOR MICROWAVE OVEN

(71) Applicant: WHIRLPOOL CORPORATION, Benton Harbor, MI (US)

(72) Inventors: Muhammad Khizar, St. Joseph, MI (US); Ermanno Buzzi, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 681 days.

(21) Appl. No.: 16/192,235

(22) Filed: Nov. 15, 2018

(65) Prior Publication Data

US 2020/0163172 A1    May 21, 2020

(51) Int. Cl.
| | | |
|---|---|---|
| *H05B 6/64* | (2006.01) | |
| *B29C 70/02* | (2006.01) | |
| *B29C 70/88* | (2006.01) | |
| *B29K 105/16* | (2006.01) | |
| *B29K 307/04* | (2006.01) | |
| *B29K 505/02* | (2006.01) | |
| *B29K 509/02* | (2006.01) | |
| *B29L 31/00* | (2006.01) | |

(52) U.S. Cl.
CPC .......... *H05B 6/6411* (2013.01); *B29C 70/025* (2013.01); *B29C 70/882* (2013.01); *B29K 2105/162* (2013.01); *B29K 2105/167* (2013.01); *B29K 2307/04* (2013.01); *B29K 2505/02* (2013.01); *B29K 2509/02* (2013.01); *B29K 2995/0005* (2013.01); *B29L 2031/779* (2013.01)

(58) Field of Classification Search
None
See application file for complete search history.

(56) References Cited

U.S. PATENT DOCUMENTS

| | | | | |
|---|---|---|---|---|
| 3,941,967 A | * | 3/1976 | Sumi ................. | A47J 36/027 219/729 |
| 4,542,271 A | * | 9/1985 | Tanonis .............. | H05B 6/6494 219/730 |
| 5,268,546 A | * | 12/1993 | Berg .................. | H05B 6/6411 219/728 |
| 5,294,763 A | * | 3/1994 | Chamberlain ..... | B65D 81/3446 219/729 |
| 5,523,549 A | * | 6/1996 | Tenzer .............. | H05B 6/64 219/730 |

(Continued)

FOREIGN PATENT DOCUMENTS

EP    0240235 A1    10/1987
WO    2007015710 A1    2/2007

(Continued)

OTHER PUBLICATIONS

Wadhawan, et al., "Nanoparticle-assisted microwave absorption by single-wall carbon anotubes", Sep. 29, 2003, Applied Physics Letters, vol. 83, No. 13, pp. 2683-2685.*

*Primary Examiner* — Ibrahime A Abraham
*Assistant Examiner* — Gyounghyun Bae
(74) *Attorney, Agent, or Firm* — Price Heneveld LLP

(57) ABSTRACT

A liner for a crisp plate includes ceramic nanoparticles and a polymer material combined with the ceramic nanoparticles to provide a mixture. A network of carbon nanotubes is embedded within the mixture to form a composite matrix, wherein the carbon nanotubes are unidirectionally aligned within the composite matrix.

20 Claims, 3 Drawing Sheets

(56) References Cited

U.S. PATENT DOCUMENTS

| | | | |
|---|---|---|---|
| 5,567,338 A * | 10/1996 | Idebro | H05B 6/74 219/718 |
| 5,595,673 A * | 1/1997 | Ekstrom | H05B 6/6482 219/710 |
| 5,853,632 A | 12/1998 | Bunke et al. | |
| 6,420,293 B1 | 7/2002 | Chang et al. | |
| 6,858,173 B2 | 2/2005 | Zhan et al. | |
| 6,986,942 B1 | 1/2006 | Mayes | |
| 7,306,828 B2 | 12/2007 | Barrera et al. | |
| 8,269,154 B2 | 9/2012 | Samuels et al. | |
| 9,232,618 B2 | 1/2016 | Bourke, Jr. et al. | |
| 9,249,528 B2 | 2/2016 | Mitra et al. | |
| 9,769,884 B2 * | 9/2017 | Niklasson | H05B 6/6402 |
| 2005/0236407 A1 | 10/2005 | Aisenbrey | |
| 2006/0118554 A1 * | 6/2006 | Aisenbrey | H05B 6/66 219/761 |
| 2007/0062936 A1 | 3/2007 | Young et al. | |
| 2008/0210473 A1 | 9/2008 | Zhang et al. | |
| 2009/0045374 A1 | 2/2009 | Lawrenz et al. | |
| 2011/0297671 A1 * | 12/2011 | Nordh | H05B 6/6494 219/690 |
| 2011/0297672 A1 * | 12/2011 | Niklasson | H05B 6/6402 219/702 |
| 2011/0309311 A1 * | 12/2011 | So | C06B 21/0066 252/503 |
| 2013/0098904 A1 * | 4/2013 | Harada | F27B 5/14 219/756 |
| 2014/0224789 A1 * | 8/2014 | Adonyi | H05B 6/80 219/690 |
| 2014/0238250 A1 | 8/2014 | Gephart et al. | |
| 2015/0182995 A1 * | 7/2015 | Theodore | H05B 6/6491 219/759 |
| 2016/0015207 A1 | 1/2016 | Park | |
| 2016/0360920 A1 | 12/2016 | Park | |
| 2017/0080628 A1 * | 3/2017 | Topolkaraev | B29C 51/10 |
| 2018/0220500 A1 * | 8/2018 | Staton | A47J 37/0623 |

FOREIGN PATENT DOCUMENTS

| | | |
|---|---|---|
| WO | 2011127148 A1 | 10/2011 |
| WO | 2016118151 A1 | 7/2016 |

\* cited by examiner

HYBRID NANOREINFORCED LINER FOR MICROWAVE OVEN

BACKGROUND

The present device generally relates to a liner material, and more specifically, to a liner for use with a microwave oven, wherein the liner is comprised of materials suitable for improving the overall performance of a microwave oven, improving cooking times and cooking thoroughness, and making the microwave oven more energy efficient.

Microwave oven cooking has always been problematic in terms of the excessive power required to generate the appropriate heat for cooking. This is mainly due to excessive wastage of the produced heat caused by heat dissipation. Therefore, significant efforts are needed to reduce cavity generated heat losses which can be utilized in cooking to improve the process and the quality of the cooked food.

In current microwave ovens, the supporting parts and assemblies, along with the turn-table or crisp plate, acts as non-conductive materials (dielectric) which absorb microwave radiations as a dielectric loss. Dielectric loss quantifies a dielectric material's inherent dissipation of electromagnetic energy. Such properties are frequency dependent for frequencies in the range of 2.4 GHz, as used in a microwave oven. As a result, ferrite particles embedded within silicon have been used to control the heat within current backing plates and trays. This measure helped to improve the crisp plate performance to a certain extent, but due to their microwave frequencies activation limitation and Curie temperature Tc limitation of used ferrite, targeted benefits were not achieved. Realizing the conductive nature of the current crisp plate materials (such as aluminum) which heat up for various reasons such as antenna effects and ohmic loss, and the heavy loads imposed on the microwave generating device, it is important to use an excellent electromagnetic radiation absorbing material as compared to the existing ferrite and silicon coated crisp plates. For a typical microwave oven, an existing crisp plate may contain up to 90% micro-powder by weight under ~110 bar forming pressure fired at 1050° C. to 1150° C. in air. The shrinkage rate of such a crisp plate largely depends on the micro-powder used in forming the crisp plate. When such plates are used in a microwave oven without an efficient electromagnetic radiations absorbing coating/film attached, the crisp plate draws significant radiation (energy) from a microwave generator. This issue is compounded in larger microwave ovens. This imposes serious restrictions on the utilization of functional heat sources and tends to introduce issues linked to the quality of the cooked food.

Thus, a nano-reinforced liner system is desired that uses a hybridization of carbon nanotubes to proprietary ceramic materials and selected elastomeric materials. Unique about this hybrid material system is the tuning properties under the exposure of microwave frequencies.

SUMMARY

In at least one aspect, a crisp plate, includes a plate and a liner disposed on a surface of the plate. The liner includes a network of carbon nanotubes combined with aluminum nanoparticles and ceramic alumina material. The network of carbon nanotubes is embedded within a polymer matrix, and are unidirectionally aligned within the matrix.

In at least another aspect, a liner for a crisp plate includes aluminum and ceramic nanoparticles and a polymer combined with the ceramic nanoparticles to provide a mixture. A network of carbon nanotubes is embedded within the mixture to form a composite matrix, wherein the carbon nanotubes are unidirectionally aligned within the composite matrix.

In at least another aspect, a method of forming a liner for a crisp plate includes the steps of 1) providing a polymer matrix; 2) embedding a network of unidirectionally aligned carbon nanotubes along with aluminum nanoparticles within the polymer matrix to provide a composite matrix; and 3) providing a ceramic alumina component to the composite matrix to form a nanoreinforced liner.

These and other features, advantages, and objects of the present device will be further understood and appreciated by those skilled in the art upon studying the following specification, claims, and appended drawings.

DETAILED DESCRIPTION OF EMBODIMENTS

Figure 1:
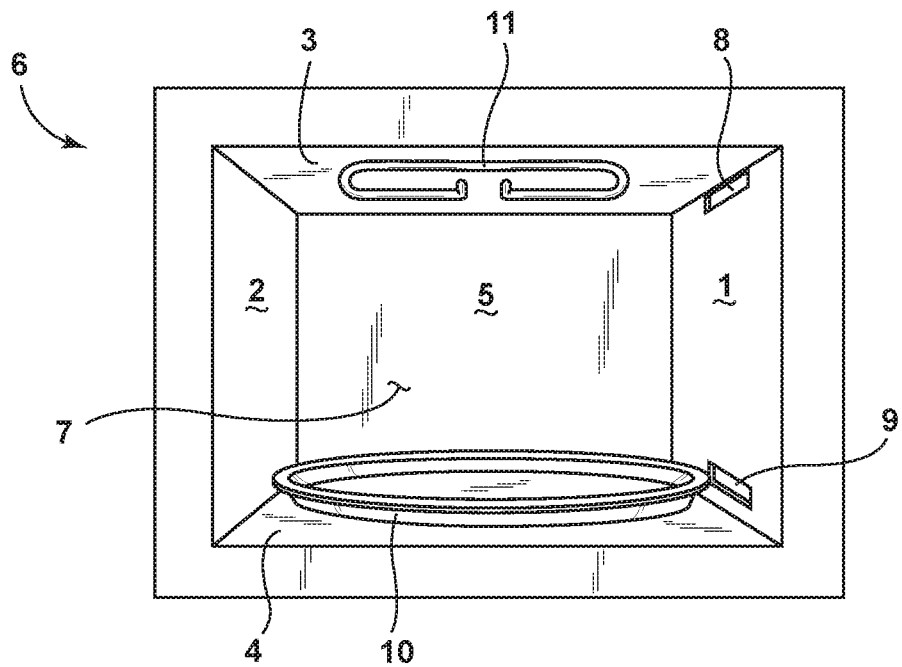
FIG. 1 is a front perspective view of a microwave oven having a crisp plate disposed in a cavity thereof.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Proposed is a hybrid nanoreinforced liner developed with carbon nanotubes embedded in a select material matrices. The liner is configured for enhanced electromagnetic radiation absorbing properties, so that the liner offers excellent self-heating performance, especially when exposed to microwave radiations. For this, a proposed liner includes a matrix of fully dense nanocomposites of carbon nanotubes with aluminum nanoparticles and nanocrystalline ceramic nanoparticles, such as aluminum nanoparticles (Al, 99.9%, 30-50 nm) and alumina ($Al_2O_3$), blended with a two-part pre-polymerized polymer with a fracture toughness of approximately 10 MPa. This hybrid nanoreinforced liner provides enhanced electromagnetic radiation absorbing capabilities without dissipation of the generated heat when the liner is provided on a surface of a crisp plate in a microwave oven.

In developing the hybrid nanoreinforced liner, chemical vapor deposition grown carbon nanotubes are mixed with aluminum nanoparticles (Al, 99.9%, 30-50 nm) and aluminum oxide ($Al_2O_3$) nanoparticles at sintering temperatures as low as 1150° C. by spark-plasma sintering. This hybrid matrix of carbon nanotubes and aluminum oxide nanoparticles may then be blended with a two-part pre-polymerized polymer. The carbon nanotubes are contemplated to have a diameter of approximately 3 nm. It has been found that the exceptionally large surface area and nanopits of the carbon nanotubes helps to strengthen interface connections with aluminum nanoparticles and aluminum oxide nanoparticles, especially when blended with a two-part pre-polymerized polymer. More so, the incorporation of carbon nanotubes and aluminum nanoparticles into the liner helps to enhance the electrical conductivity and toughness of the liner, while reducing the brittleness of the aluminum oxide by converting the hybrid material system into an electromagnetic radiation absorbing liner. Unique about this hybrid liner is that it offers exceptionally high mechanical strength, improved resistance against corrosion and high sensitivity to electromagnetic radiation absorption. More on, the liner presents remarkably high improvements to its inter-laminar fracture toughness, de-lamination resistance, in-plane mechanical and thermal performance, damping, and thermo-elastic behavior, which makes this hybrid liner system an ideal liner for a crisp plate application.

Referring now to FIG. 1, a microwave oven 6 is shown, in which a door for closing a cavity 7 of the microwave oven 6 has been omitted. The cavity 7 is defined by sidewalls 1 and 2, a top wall 3, a bottom wall 4, and a rear wall 5. Disposed along the right sidewall 1, upper and lower input openings 8 and 9 are configured to supply of microwaves 32 (see FIG. 2A) into the cavity 7 from a microwave source via a waveguide device 30 (see FIG. 2A). The input openings 8, 9 and the waveguide device 30 are arranged to supply microwaves 32 to the cavity 7 for cooking a food substrate. In the embodiment shown in FIG. 1, an electric browning element 11 is positioned along the top wall 3 of the cavity 7 and is configured for browning the upper side of a food substrate by electric heating means.

Figure 2A:
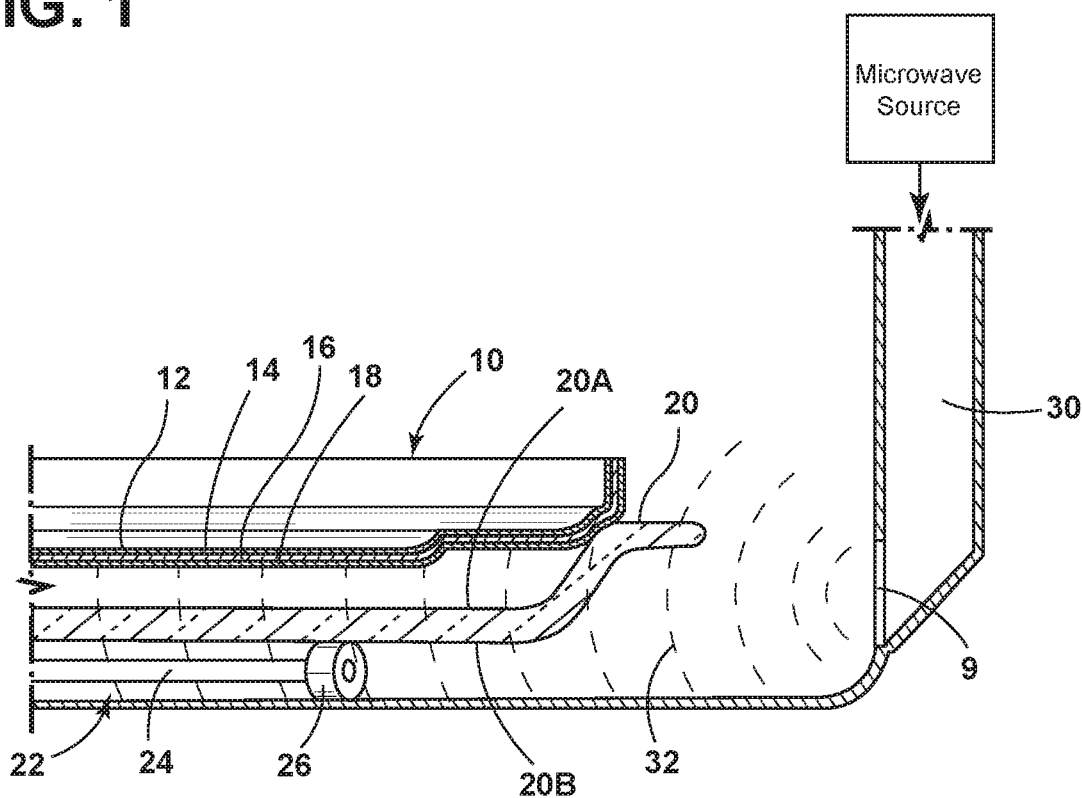
FIG. 2A is a fragmentary cross-sectional view of a microwave oven having a support plate with a crisp plate supported thereon, wherein the crisp plate includes a liner.

As further shown in FIG. 1, a crisp plate 10 is positioned on the bottom wall 4 of the cavity 7. The crisp plate 10 may be a removable plate that is positioned directly on the bottom wall 4 of the cavity 7. The crisp plate 10 may also be situated on a support plate, such as support plate 20 shown in FIG. 2A. In FIG. 2A, the crisp plate 10 is supported on an upper surface 20A of the support plate 20, and the support plate 20 is further supported from an undersurface 20B of the support plate 20 by a rotation mechanism 22 having an arm 24 and wheel 26.

In FIG. 2A, the crisp plate 10 includes a liner 12, according to the present concept. The liner 12 may include one or more layers 14, 18 which are designed to enhance the browning features of the crisp plate 10. Specifically, the liner 12 of the present concept is configured to offer uniform heating of a food substrate, provide improved heating times, consume less energy in a cooking procedure, and include upper temperature limits to avoid overcooking or burning of food substrates. In FIG. 2A, the layers 14, 18 of the liner 12 are shown disposed on upper and lower sides of a plate 16. It is contemplated that the plate 16 may be a metal plate comprised of a metal material, such as ceramic or aluminum. Further, it is contemplated that the liner 12 may be positioned on both the upper and lower sides of the plate 16, the upper side alone, or the lower side alone.

As used herein, the term "crisp plate" is meant to refer to a plate that aids in the browning or crisping of a food substrate when exposed to microwave radiation. The crisp plate 10 may also be referred to herein as a browning plate, a crisper pan, or a susceptor plate. Further, as used therein, the term "liner" is meant to refer to a coating or film that is provided on a surface of a crisp plate to improve the performance of the same. The proposed liner 12 of the present concept may be referred to herein as a coating, a film, a layer, a hybrid nanoreinforced liner, a matrix or a composite material.

The present concept relates to forming a composite coating that may include carbon nanotubes embedded into a polymer. Specifically, the composite may include the application of a polymer onto carbon nanotubes to form a composite of unidirectionally aligned carbon nanotubes embedded in the polymer matrix. The polymer material is contemplated to include a polymer suitable to form a polymer matrix in which a controlled loading concentration of carbon nanotubes and aluminum nanoparticles are unidirectionally aligned can be embedded. A ceramic material, such as alumina, is also contemplated for use with the composite coating. As used herein, the term "unidirectionally aligned" refers to the alignment of carbon nanotubes (with or without aluminum nanoparticles) in a composite, wherein the carbon nanotubes are generally horizontally aligned or parallel to a substrate, such as a crisp plate.

Alumina or aluminum oxide ($Al_2O_3$) is a commonly used fine ceramic material. It has the same sintered crystal body as sapphire and ruby. It is often used in in electrical components for its high electrical insulation, and is widely used in mechanical parts for its high strength, and corrosion-resistance and wear-resistance. The ceramic component of the present concept may be referred to herein as ceramic alumina, alumina, aluminum oxide or ceramic nanocrystalline particles.

Several types of polymers have been considered as suitable matrices for highly conductive carbon nanotube/polymer composites. Selection of a particular polymer heavily depends on a multitude of factors that must be considered in order to meet certain selection criteria. Electrical conductivity heavily depends on the ease of electron transfer throughout a material. While most polymer materials are insulators with very low electrical conductivity properties, the addition of carbon nanotubes and aluminum nanoparticles to the polymer matrix improves the electrical conductivity of the composite material due to the carbon nanotube network formation within the composite material. Using carbon nanotube-to-carbon nanotube contacts with the composite material, electron transfer throughout the polymer matrix is enabled by providing conductive pathways through the carbon nanotube and aluminum nanoparticles network. Thus, the carbon surface of the carbon nanotubes is used as a medium for ballistic transport of electrons from one carbon nanotube to another. Further, it has been found that disrupting carbon nanotube network formation plays a critical role in reducing the electrical resistivity of the carbon nanotube-polymer composite by either forming a resistive material barrier between carbon nanotubes or by limiting direct carbon nanotube interconnection. As such, the polymer matrix blended with aluminum nanoparticles alone is contemplated to have an electrical conductivity level that is less than an electrical conductivity level of the composite matrix of the polymer matrix combined with the network of carbon nanotubes. As used herein, the term "network" is contemplated to describe a formation of carbon nanotubes (with or without aluminum nanoparticles) that provides unbroken connections across a substrate, such as a crisp plate.

Figure 2B:
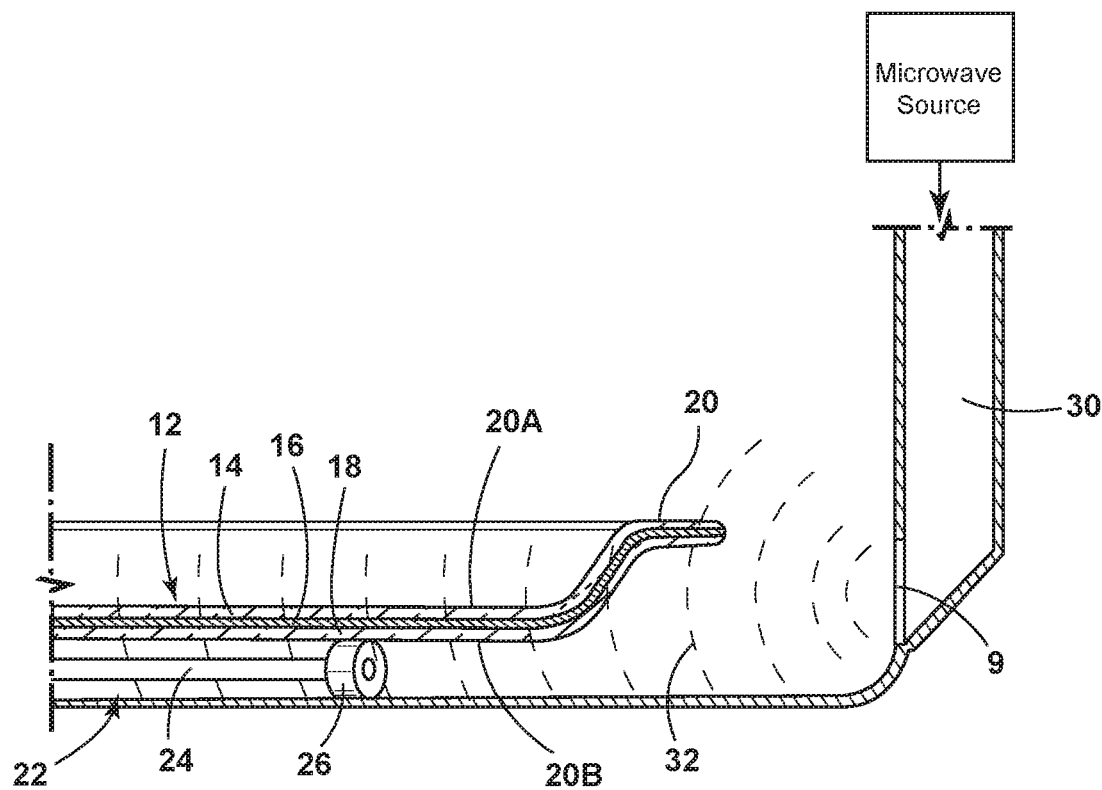
FIG. 2B is a fragmentary cross-sectional view of a microwave oven having a crisp plate with a liner disposed thereon.

Referring now to FIG. 2B, the support plate 20 itself has been coated with the liner 12 of the present concept at upper and lower layers 14, 18, such that the support plate defines a crisp plate as used in the microwave 6.

Figure 3:
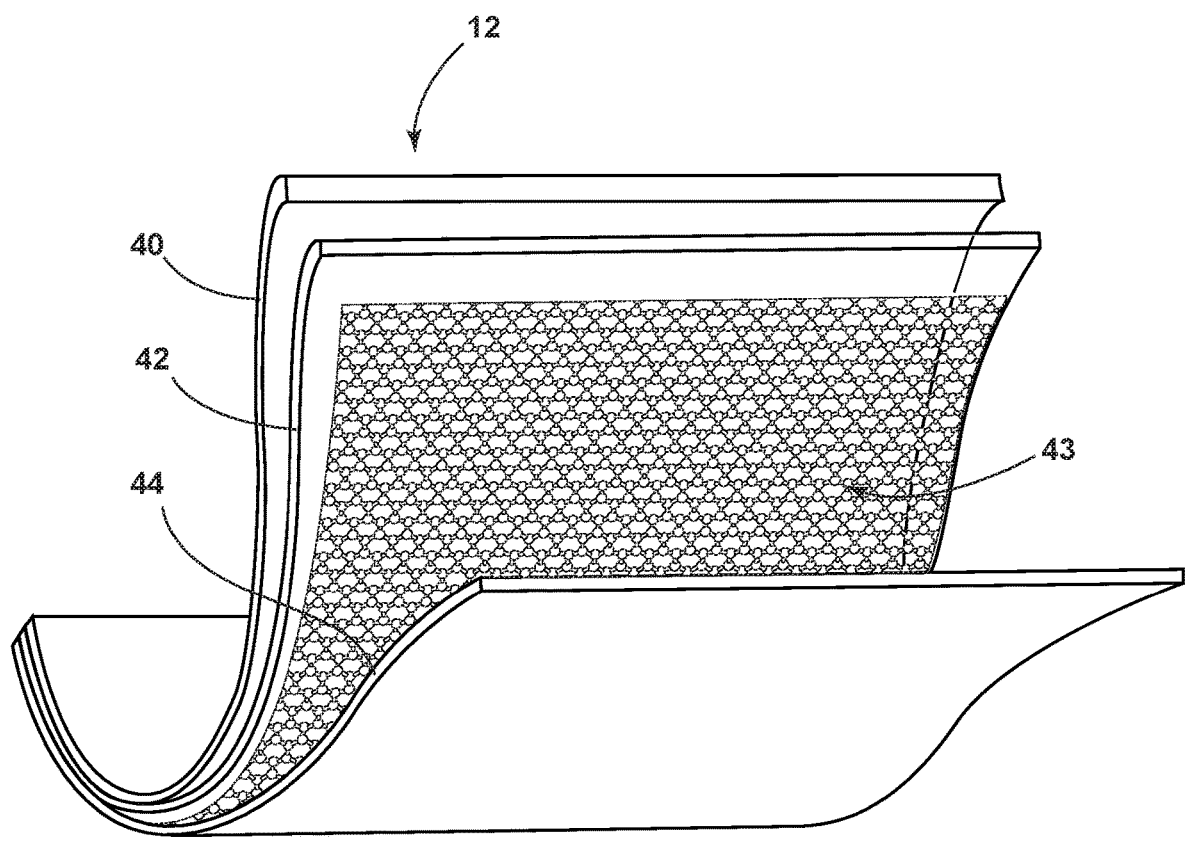
FIG. 3 is a front perspective view of a liner illustrating components of the liner in a partially exploded view.

Referring now to FIG. 3, the liner 12 is shown in a graphic illustration wherein component parts of the liner 12 are portrayed in an exploded view. The component parts of the liner 12 are contemplated to be intermixed components that may or may not be aligned in specific layers as represented in FIG. 3, but may be blended in the liner system. The liner 12 shown in FIG. 3 includes a ceramic component 40 as described above. A network 43 of unidirectionally aligned carbon nanotubes and aluminum nanoparticles 42 is also illustrated in FIG. 3. The network 43 of unidirectionally aligned carbon nanotubes along with aluminum nanoparticles 42 is contemplated to be dispersed throughout the liner 12, such that microwave absorption is consistent throughout the liner 12 as applied to a crisp plate. A polymer component 44 is also shown in FIG. 3 and is contemplated to have the carbon nanotubes along with aluminum nanoparticles 42 and alumina embedded within a matrix provided by the polymer component 44.

It is further an object of the present concept to develop certain upper temperature limits of the liner when applied to select surfaces. As noted above, the liner is to be used to create a coating for a browning plate or crisp plate disposed within a microwave, such as crisp plate 10 disposed within microwave 6 (FIG. 2A). Thus, the liner 12, as applied to the crisp plate 10 and positioned within the cavity 7 of the microwave 6, is exposed to microwaves 32. The liner 12 of the present concept is configured to rapidly heat up to a suitable cooking temperature during a cooking procedure. Specifically, the liner 12 of the present concept is configured to heat up to a cooking temperature of approximately 200° C. in approximately 2 minutes under electromagnetic radiation exposure. The liner 12 of the present concept is further configured to include an upper heat limit of approximately 250° C. The novel compilation of component parts of the liner 12 has been specifically formulated to ensure that the upper heat limit will not be exceeded regardless of the exposure time of the liner 12 to microwaves during a cooking procedure. In this way, the liner 12 provides for a crisp plate 10 that avoids over cooking or burning of food substrates by controlling the upper heat limit.

Further, the liner 12 is contemplated to provide a hybrid nano-reinforced liner system. The liner system includes a nanocoating formulation which comprises a nanostructure provided by carbon nanowires and aluminum nanoparticles. A liquid two-part pre-polymerized polymer having one or more functional groups is configured to graft to the nanostructure of the nanoparticles. A final component of the liner 12 includes alumina. The combined components of the liner 12 result in a liner having an enhanced response to microwave radiation absorption, as compared to other known liner systems.

In another embodiment of the present concept, the liner 12 includes carbon nanotubes that are dispersed in a liquid polymer, and an effective amount of a synthetic additive, such as aluminum nanoparticles and ceramic alumina, that form a strong interaction with the carbon nanotube and liquid polymer blend. It is contemplated that this ceramic alumina is provided in solution, such that the effective amount of carbon nanotubes suspended in the liquid polymer can be mixed with the effective amount of the aluminum nanoparticles and ceramic alumina dissolved in a solvent to create a coating of the present concept. The aluminum nanoparticles may include metallic aluminum dissolved in a solvent, and the ceramic alumina may include ceramic alumina nanoparticles dissolved in a solvent. A substrate, such as the metal crisp plate 16, may be coated with the intermixed coating using one of the techniques noted below.

After the substrate is coated, it is allowed to air cure to provide a thin liner coating having a thickness of about 150 microns to about 200 microns on the crisp plate substrate.

The coating of the present concept provides for a hybrid nano-reinforced liner system that is comprised of a composite matrix created by combining a polymer, aluminum nanoparticles, ceramic alumina, and carbon nanotubes which are unidirectionally aligned. By incorporating a controlled loading concentration of carbon nanotubes into a specialty polymer matrix with aluminum nanoparticles and ceramic alumina, the electrical conductivity of the polymer is increased and mechanical stability is reinforced.

Among the key contributing factors in the conductivity enhancement of carbon nanotube-polymer composites are the dispersion of the carbon nanotubes throughout the polymer matrix. This dispersion of the carbon nanotubes throughout the polymer matrix increases carbon nanotube-to-carbon nanotube interconnection and network formation, thereby further increasing electrical conductivity of the composite material.

Structural alignment of carbon nanotubes in a uniform direction has been ensured to achieve higher electrical conductivity values by controlling carbon nanotubes loading concentrations and their random dispersion. This is important to provide direct, unidirectional conductive pathways which allows for unobstructed electron transport throughout the composite material, thereby helping to increase electrical conductivity throughout a polymer matrix. Through a parallel plate's setup, a high voltage electric field is applied across a mixture of carbon nanotubes and a low viscosity medium resulting in the unidirectional alignment of the carbon nanotubes. To ensure the carbon nanotubes effectively align within a high viscosity polymer, an electric field vacuum system technique is used. The highly viscous two-part pre-polymerized polymer acts as a barrier to carbon nanotube movement. The electric field vacuum system technique helps for uniform dispersion and alignment of the carbon nanotubes when spraying a mixture of carbon nanotubes blended with aluminum nanoparticles and ceramic alumina within an electric field to ensure rapid dispersion of the carbon nanotubes.

The electric field vacuum system technique noted above comprises a vacuum, a filter chamber, a high voltage power supply, a filter, an electrical wiring, and a spray system. Ceramic alumina, used as one of the additives, plays an important role in improving hardness, chemical inertness and higher melting point of the matrix and can retain up to 90% of its strength even at 1100° C. Furthermore, use of a ceramic alumina component is important for any spray coating process because any such coatings are attacked by voids which could compromise the corrosion resistance of the coating. Controlled loading of ceramic alumina can play a pivotal role in improving the impact strength of the liner 12, reducing the generation of voids, and improving the high temperature resistance of the hybrid liner system.

To be more specific, the application of the polymer onto the carbon nanotubes forms composites that comprise unidirectionally aligned carbon nanotubes embedded within the polymer. In order to maintain unidirectional alignment of the carbon nanotubes used as active ingredients, conductive plates or adjustable conductive plates are used, such that parallel conductive plates of copper electrode material allow for adjusting a direction of the electric field in order to form unidirectionally aligned carbon nanotubes at various desired angles. Technically, such desired angles may range from about 0° to about 135° from the direction of an electric field having strengths of 115 V/cm, and 220 V/cm.

One type of polymer considered to be suitable for the coating of the present concept is RBL-9050-50P Liquid Silicone Rubber. Two-part, 10 to 1 mix, clear, fabric coating grade liquid silicone rubber offers unique homogeneous mixing. This two-part pre-polymerized polymer composite is the 10 to 1 mix, clear, fabric coating grade liquid silicone rubber which has an extremely low viscosity, no post-curing requirements, and excellent electrical insulating properties. Further, this two-part pre-polymerized polymer composite is equally suitable for spray-on and dip coating applications. The 10 to 1 mix of this polymer refers to the 10 to 1 base to catalyst 87-RC ratio of the polymer.

Different forms of carbon nanotubes may be utilized with the methods, systems and composites of the present concept. For example, the carbon nanotubes utilized with the proposed coating system could be single-wall carbon nanotubes, double-wall carbon nanotubes, few-wall carbon nanotubes, multi-wall carbon nanotubes, ultra-short carbon nanotubes, and combinations thereof. In some cases, the carbon nanotubes are functionalized, metal-coated and pristine carbon nanotubes. Carbon nanotubes that are to be applied to various systems of the present invention may be provided in a solution, such as a dispersant. Such solutions may also comprise surfactants to aid in the dispersion. Non-limiting examples of suitable surfactants include LDS, SDS, Zwitterionic surfactants, cationic surfactants, anionic surfactants, and the like. In more specific embodiments, the carbon nanotubes may be dispersed in N-methylpyrrolidone (NMP).

Example 1

For Example 1, the hybrid liner matrix is prepared using purified few-wall carbon nanotubes of controlled loading concentration of 1.5 wt % mixed with liquid silicone rubber and ceramic alumina. The process of creating the hybrid liner starts with the dispersion of the carbon nanotubes into a liquid polymer by using a 900 W ultrasonic probesonicator for approximately 45 minutes to create a composite matrix of the polymer and carbon nanotubes. The composite matrix is then decanted using a centrifuge set at approximately 10,000 rpm to settle out larger carbon agglomerates followed by mixing the composite matrix with ceramic alumina (15 wt %). This combination is then heated to approximately 120° C. The polymer along with aluminum nanoparticles and ceramic alumina forms a matrix which enables ease of its handling, cross-linking networking, and minimizes all those issues linked with the abrupt shrinkage strain upon polymerization via the progressive substitution of the pelletized silicon by the pre-polymerized liquid polymer. Specifically, the polymer has a low viscosity, doesn't require post-curing, offers excellent electrical insulating properties, is easily pigmented, and is suitable for spray-on and dip coating applications. In order to avoid the entrapment of any air bubbles during the mixing process, the mixture was thoroughly de-gassed under vacuum to avoid the build-up of voids which may eventually effect the overall performance, especially when used as a blending agent.

As another option, the present invention matrix can also be incorporated as more than one layer as a result of the repetition of the above-described methods of the present concept. For this, each layer comprises unidirectionally aligned carbon nanotubes that are embedded in a polymer matrix to form a multilayer structure that includes a liner, as described above, coated with a same liner composition. The highly aligned carbon nanotubes in polymer matrices significantly improve the electrical, mechanical and thermal properties of the composites of the present coating. Various spraying techniques may be utilized. For example, the spraying may involve electro-spraying, mechanical or manual spraying options can be used. Additional methods may include, without limitation, spincoating, drop-casting, dip coating, physical application, sublimation, blading, ink-jet printing, screen printing, injection molding, and direct placement. The overall thickness of proposed hybrid reinforced liner coating is approximately 1 mm to 1.2 mm depending on the flatness requirements of the substrates to be coated.

In summary, the methods and systems of the present invention can be tailored to various sizes and shapes, along with the use of different carbon nanotubes or polymers based on the multifunctional composite requirements. The formed composite coating or thin film along with spray coating option, can also be cut in several ways to produce a cylindrical shape and other such geometries. In short, a hybrid composite liner system is developed by utilizing different sizes carbon nanotubes, a selected liquid polymer, aluminum nanoparticles, and ceramic alumina in a single reaction to achieve highly uniform surfaces with fast heating rate and provided an access to tune nanotubes through irradiated microwave radiations, such that an upper temperature limit is provided by exploiting a controlled loading concentration of carbon nanotubes embedded into its blending agents.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A crisp plate, comprising:
   a plate;
   a liner disposed on a surface of the plate, wherein the liner includes:
      a network of carbon nanotubes combined with aluminum nanoparticles and ceramic alumina; and
      a polymer configured to form a matrix, wherein the network of carbon nanotubes is embedded within the matrix, and further wherein the carbon nanotubes are unidirectionally aligned within the matrix.

2. The crisp plate of claim 1, wherein the carbon nanotubes are multi-walled carbon nanotubes.

3. The crisp plate of claim 1, wherein the carbon nanotubes are single-walled carbon nanotubes.

4. The crisp plate of claim 1, wherein the carbon nanotubes are double-walled carbon nanotubes.

5. The crisp plate of claim 1, wherein the carbon nanotubes are few-walled carbon nanotubes.

6. The crisp plate of claim 1, wherein the carbon nanotubes are ultra-short carbon nanotubes.

7. The crisp plate of claim 1, wherein the polymer includes a two-part based pre-polymerized polymer.

8. The crisp plate of claim 1, wherein the liner includes 1.5% by weight of the polymer.

9. The crisp plate of claim 8, wherein the liner includes 15% by weight of the ceramic alumina.

10. A liner for a crisp plate, comprising:
    aluminum nanoparticles;
    ceramic nanoparticles;
    a polymer material combined with the ceramic nanoparticles to provide a mixture; and
    a network of carbon nanotubes combined with the aluminum nanoparticles and embedded within the mixture to form a composite matrix, wherein the carbon nanotubes are unidirectionally aligned within the composite matrix.

11. The liner of claim 10, wherein the mixture includes 1.5% by weight of the polymer material, and further includes 15% by weight of the ceramic nanoparticles.

12. The liner of claim 10, wherein the liner heats up to 200° C. within two minutes or less when exposed to microwaves.

13. The liner of claim 10, wherein the liner includes an upper heat limit of 250° C. when exposed to microwaves.

14. The liner of claim 10, wherein the carbon nanotubes are selected from the group consisting of single-wall carbon nanotubes, double-wall carbon nanotubes, few-wall carbon nanotubes, multi-wall carbon nanotubes, ultra-short carbon nanotubes, and combinations thereof.

15. A method of forming a liner for a crisp plate, comprising:
    providing a polymer matrix;
    embedding a network of unidirectionally aligned carbon nanotubes within the polymer matrix to provide a composite matrix; and
    providing aluminum nanoparticles and ceramic alumina to the composite matrix to form a nanoreinforced liner.

16. The method of claim 15, wherein the polymer matrix includes a two-part pre-polymerized liquid polymer.

17. The method of claim 16, wherein the aluminum nanoparticles includes metallic aluminum nanoparticles dissolved in a solvent, and further wherein the ceramic alumina includes ceramic alumina nanoparticles dissolved in a solvent.

18. The method of claim 15, wherein the polymer matrix includes an electrical conductivity level that is lower than an electrical conductivity level of the composite matrix.

19. The method of claim 15, wherein the carbon nanotubes are selected from the group consisting of single-wall carbon nanotubes, double-wall carbon nanotubes, few-wall carbon nanotubes, multi-wall carbon nanotubes, ultra-short carbon nanotubes, and combinations thereof.

20. The method of claim 15, including:
    coating the liner to form a multilayer structure with a second liner formed according to the method of claim 15.

* * * * *